No. 884,897. PATENTED APR. 14, 1908.
L. R. CLIFTON.
COMBINED SICKLE BAR AND CUTTER.
APPLICATION FILED AUG. 13, 1907.

2 SHEETS—SHEET 1.

WITNESSES:
G. R. Thomas
Arthur W. Crossley

INVENTOR
Lee R. Clifton
BY Chandler & Chandler
Attorneys

No. 884,897.
PATENTED APR. 14, 1908.
L. R. CLIFTON.
COMBINED SICKLE BAR AND CUTTER.
APPLICATION FILED AUG. 13, 1907.
2 SHEETS—SHEET 2.
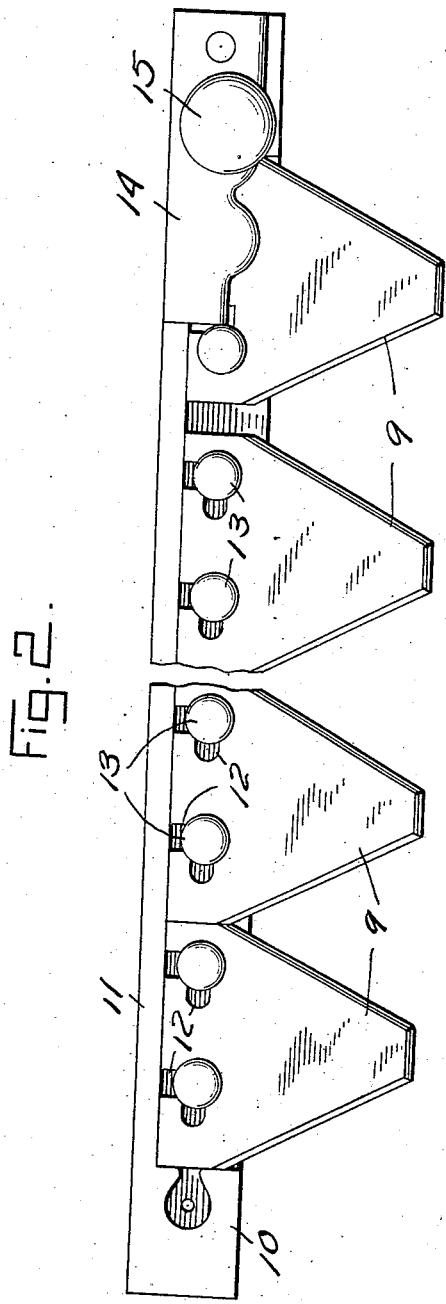
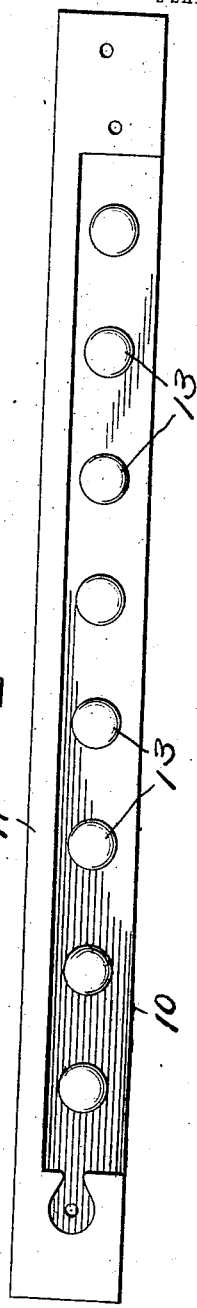
WITNESSES:
G. R. Thomas
Arthur W. Cromley
INVENTOR
Lee R. Clifton
BY
Attorneys

UNITED STATES PATENT OFFICE.

LEE R. CLIFTON, OF LAWRENCEBURG, TENNESSEE, ASSIGNOR OF ONE-HALF TO JAMES CLIFTON, OF LAWRENCEBURG, TENNESSEE.

COMBINED SICKLE-BAR AND CUTTER.

No. 884,897.　　　　Specification of Letters Patent.　　Patented April 14, 1908.

Application filed August 13, 1907. Serial No. 388,359.

*To all whom it may concern:*

Be it known that I, LEE R. CLIFTON, a citizen of United States, residing at Lawrenceburg, in the county of Lawrence, State of Tennessee, have invented certain new and useful Improvements in Combined Sickle-Bars and Cutters; and I do hereby declare the following to be a full, clear, and exact description of the invention, such as will enable others skilled in the art to which it appertains to make and use the same.

This invention has relation to reciprocating sickle-bars in harvesting and mowing machines, which carry the sickle-knives in the operation of cutting grain; etc.

Heretofore, if a particular sickle knife has in any way become impaired so as to be in need of correction or replacement by another while at work in the field there has been more or less trouble, annoyance and waste of time in repairing it or replacing it with another; and when particular knives have needed regrinding during the "nooning time" or other periods when the machine has necessarily been standing idle, it has not been convenient or expedient, because of the long time required to remove the damaged knives, for regrinding and replacement, in order that the machine could be quickly put in condition for use in the field.

It is the object of the present improvements to render the knives easily removable and replaceable on the reciprocating or sliding bar besides making the construction more simple, efficient and ready of manipulation.

The nature of the invention is fully and clearly ascertainable from the device portrayed in the annexed drawings, forming a part of this specification, in view of which it will first be described with respect to its construction and mode of operation, and then be pointed out in the subjoined claims.

Figure 1:
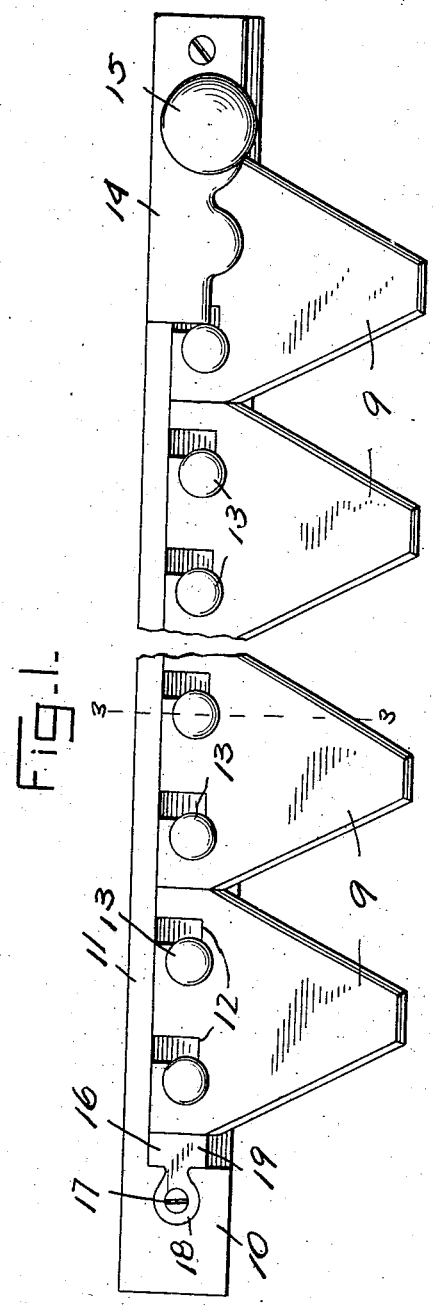
Figure 5:
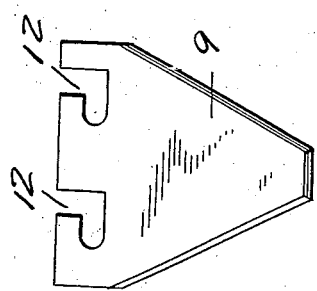
Figure 3:
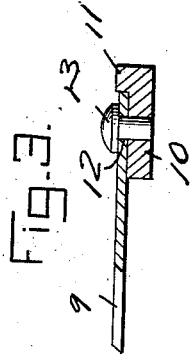

Of the said drawings—Figure 1 is a plan. Fig. 2 is a similar view showing the locking key removed. Fig. 3 is a cross section in the plane 3 3, Fig. 1. Fig. 4 is a view of the reciprocating sickle bar with the knives removed. Fig. 5 is a plan of a single knife detached.

Similar characters of reference designate similar parts or features, as the case may be, wherever they occur.

In the drawings 10 designates the reciprocating sickle-bar which is provided on its rear edge with a substantial rib, 11, against which the rear edges of the cutter-knives 9 rest. The latter are provided with angular slots 12 which are adapted to fit the shanks of the headed bolts or studs 13 that are riveted or screwed into the upper side of the sickle-bar 10 at proper intervals and points, so that one knife after another from one to the right of the bar under the plate 14 of the pitman-ball 15 can be moved into place until all are properly arranged under the headed bolts, when the fastening key 16, which is adapted to be secured by a screw 17 on the end of the sickle-bar 10 opposite the end to which the plate 14 is secured thereto.

A recess is made in the sickle-bar so that the projection 18 of the key 16, through which the fastening screw 17 passes may fit snugly therein the broadened side of the key 19 on the end opposite from the projection 18 bearing against the adjacent base side of the cutter, will lock or hold the entire line of cutters 9 in place on the sickle-bar.

There is an angular slot 12 formed in the base of each cutter or knife 9 and a headed bolt, of course for each slot. This construction provides for holding each cutter down firmly on the sickle-bar without the aid of a top-plate or anything similar thereto.

In placing the cutters in position on the bar, the one on the right, under the plate 14 will first be moved into place by so arranging it that the shanks of the headed bolts will first pass through the longitudinal portion of the slots, and then by moving the cutter laterally the said shanks will enter the lateral portion of the slots. The successive cutters will be placed in position in the same way until the last in line on the bar is put in place which last cutter will be secured by the key 16, which will be fixed in place against its outer side holding all the knives securely.

When it is desired to remove any knife in the line, all that it is necessary to do is to take out the key 16, when the knives may be removed one after another until the desired knife is reached, when it can be taken out and repaired or replaced with another and the released knives quickly restored to and keyed into place. This work can be done as readily in the field as in a workshop.

The rib 11 of the sickle-bar is a substantial aid to the proper supporting of the knives, as it relieves the shanks of the bolts of a substantial amount of the pressure thereon when the machine is in operation.

The invention is at once simple, easily and quickly operated and cheapens the cost of construction. The facility with which the knives may be removed and replaced is of especial importance in the case.

In Fig. 2 I have shown the key 16 as removed and the three knives or cutters to the left represented as being pushed in the latter direction, so that either of the said knives may be drawn out of place by simply pulling upon them. This view is given simply to illustrate how any one of several knives on the cycle bar may be removed without entirely displacing any of the others, and when the removed knife or cutter is put back in position all that is necessary to replace all of the knives in proper position is to move them to the right on the cycle bar and replace the binding or securing key 16.

What is claimed is—

The combination, with the cutter-bar having a rib at its rearward side and provided at intervals with headed-bolts secured in the bar, of cutters having angular notches in their rear margins, formed to receive the shanks of the bolts therein, with the heads of the bolts bearing on the upper sides of the knives, the rear edges of the knives bearing against said rib and a removable key inset in the upper side of the bar and abutting against the side of the knife last placed in position on the bar.

In testimony whereof, I affix my signature, in presence of two witnesses.

LEE R. CLIFTON.

Witnesses:
 B. D. SCOTT,
 JAS. CLIFTON.